INVENTORS
LLOYD F. POLLARD AND
FRANK A. HERRMANN
BY
THEIR ATTORNEY

July 14, 1942.    L. F. POLLARD ET AL    2,290,069
TIMEKEEPING INSTRUMENT TESTING DEVICE
Filed July 13, 1939    3 Sheets-Sheet 2

INVENTORS
LLOYD F. POLLARD AND
FRANK A. HERRMANN
THEIR ATTORNEY

July 14, 1942.                L. F. POLLARD ET AL                2,290,069
                      TIMEKEEPING INSTRUMENT TESTING DEVICE
                           Filed July 13, 1939          3 Sheets-Sheet 3
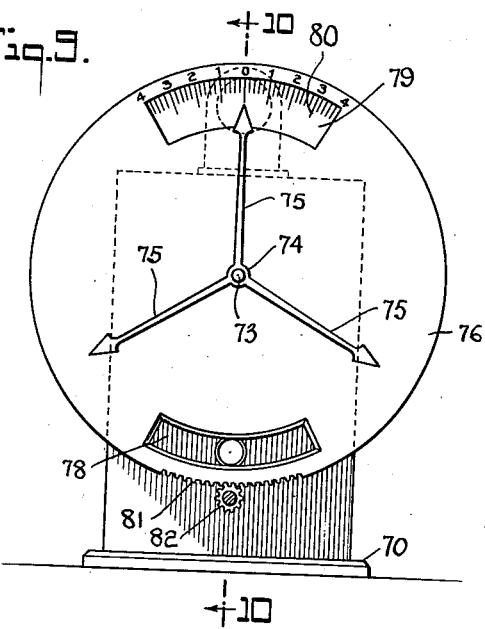
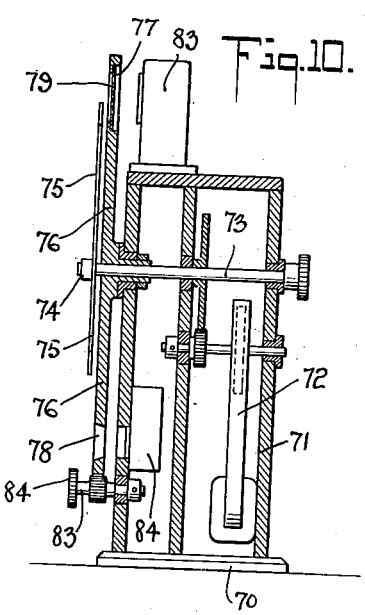
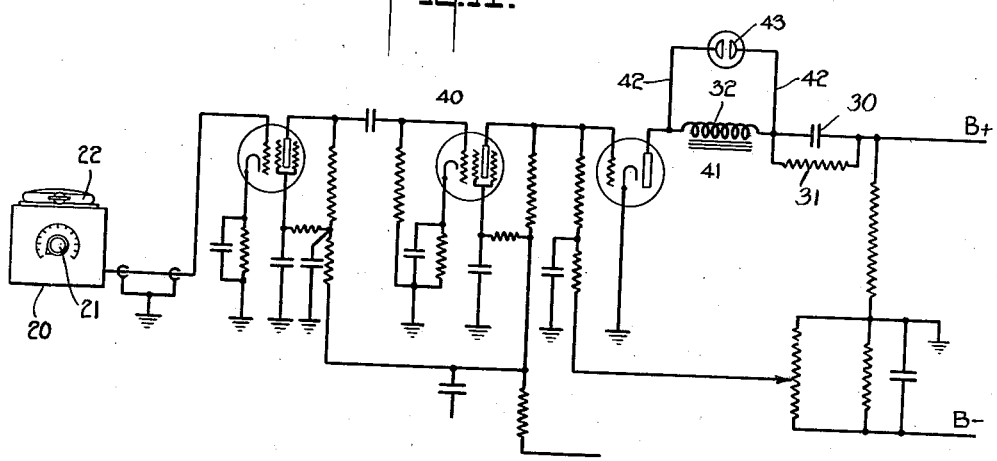
INVENTORS
LLOYD F. POLLARD AND
FRANK A. HERRMANN
BY
THEIR ATTORNEY Patented July 14, 1942

2,290,069

UNITED STATES PATENT OFFICE 2,290,069

TIMEKEEPING INSTRUMENT TESTING DEVICE

Lloyd F. Pollard, Jersey City, N. J., and Frank A. Herrmann, Forest Hills, N. Y., assignors to Malcor Products, Newark, N. J., a corporation of New Jersey Application July 13, 1939, Serial No. 284,178

4 Claims. (Cl. 73—51)

Our present invention relates to improvements in testing and calibrating apparatus for calibrating and determining the rate of operation of measuring instruments, particularly of timekeeping instruments such as watches and clocks.

In calibrating time-keeping instruments, particularly watches, it has been the universal custom until recently to employ a slow, laborious to determine the accuracy of movement of the instrument in various positions and at various stages of the condition of wind of the energizing means, that is the main spring. As is well known, a watch which is adjusted merely in one position, as for example, an upright position, will run correctly in no other position and the rate or frequency of movement of the escapement means will depend upon the condition of wind of the spring, that is, in general it will run slower if the spring is tightly wound and as the spring "runs down" the rate of movement will be faster. Therefore, in order to adjust a watch properly for time-keeping accuracy, it is necessary to adjust it in as many as five positions. This process requires a considerable length of time for which the watch repairer has found it difficult to justify a proper charge commensurate with the time involved. Further, even with this laborious process it is extremely difficult except as modified by the skill of the adjuster to determine the pulsing or swinging movement of the balance wheel and to properly adjust the same for regular even escapement. So far as is known the only way in which this can be done is by a visual inspection of the escapement movement while the same is in motion and due to the naturally rapid pulsing or beating movement of the balance wheel this operation is extremely difficult.

In accordance with our present invention, suitable testing apparatus is employed and is equipped with means for visually indicating the rate of beat of the balance wheel and in connection with a constantly rotating mechanism visually indicates, during a predetermined period of time, the rate of movement of the balance wheel, and enables the operator to determine with extreme accuracy the amount of variation—whether fast or slow—of the balance wheel by subjecting the watch to the testing operation. This information may be determined accurately in a period of time of not greater than 30 seconds and will represent accurately the amount of variation, if any, either fast or slow, over a period equal to approximately 24 hours. Therefore, the adjustment of a watch in all possible positions may be effected in a period of less than an hour and represents a saving of time over the days necessarily heretofore required.

The information above referred to as being visually indicated may also in our device be automatically recorded and a written record of the action of the time-keeping mechanism in all positions of adjustment may be kept as a matter of permanent record.

An object of our invention therefore is an improved apparatus for calibrating a watch or clock movement.

Another object of our invention is to provide apparatus for visually indicating the degree of variation of the working parts of a watch from standard.

A further object of our invention is an improved timing or calibrating apparatus for watches and other time-keeping instruments for automatically recording the degree of variation of moving parts thereof from standard.

Other objects and novel features of the apparatus comprising our device will appear as the description of the invention progresses.

In the accompanying drawings,

Fig. 9 is a front elevation of a dial of an apparatus showing a modification of the apparatus shown in Figure 5;

Fig. 10 is a central sectional side elevation taken on the line 10—10 of Figure 9, and Fig. 11 is a plan view of a spark indicating means used in connection with a dial such as is shown in Fig. 9 or in Fig. 5.

Figure 1:
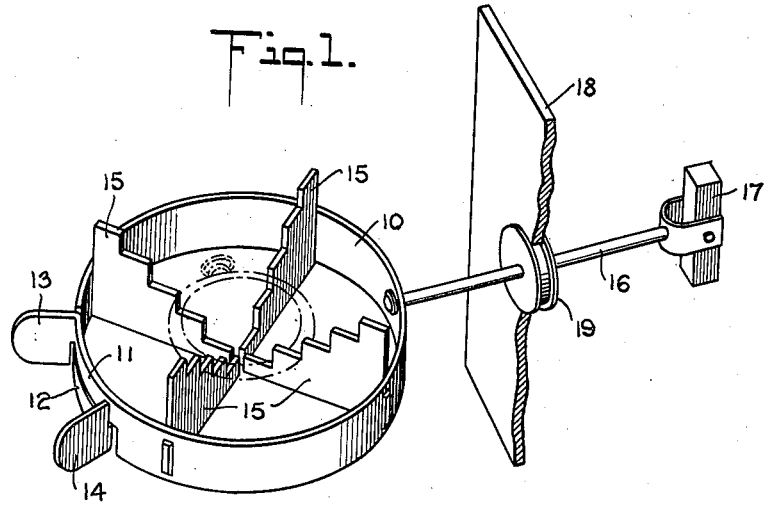
Fig. 1 is a perspective view of the mechanism for holding a watch in association with a microphone pick-up for transmitting the beats of the balance wheel to an electrically operated amplifying device.

Referring to the drawings, and particularly to Figure 1 there is shown a perspective view of a clamp for holding a watch or other time-keeping instrument to be calibrated. There is employed a band 10 of spring metal, which is formed into a short cylinder and the ends thereof overlap as indicated by the reference numerals 11 and 12. On the overlap portion 11 there is a radially extending finger 13 and on the overlapping portion 12 is a radially extending finger 14. These radially extending fingers may be readily grasped between the thumb and forefinger of the operator and thus increase the diameter of the short cylinder formed from the metal band 10. The band 10 is provided with radially extending stepped members 15 for holding a watch or other time-keeping mechanism of any size within the capacity of the device in position by the tension of the spring material from which is formed the short cylinder 10. Rigidly secured to the short cylinder 10 and extending radially outward therefrom to any suitable distance is a rod 16 provided at its free end with a microphone pick-up 17. The rod 16 passes through a partition plate 18 and is surrounded by a dampening device 19 of rubber or other suitable dampening material.

Figure 2:
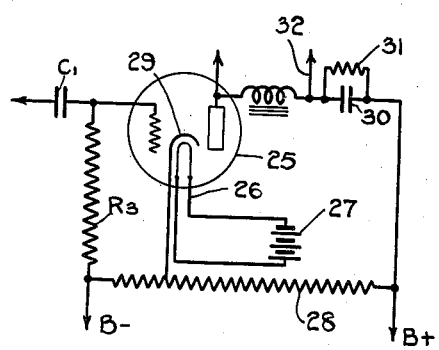
Figures 2, 3 and 4 are various forms of grid glow triode circuits utilized in converting received electrical or mechanical impulses, and transmitting the same to an amplifying circuit.
Figure 3:
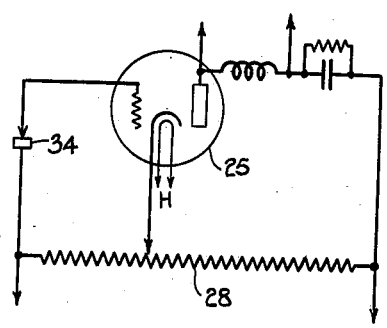
Figure 4:
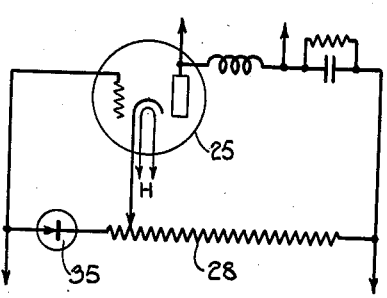
Figure 5:
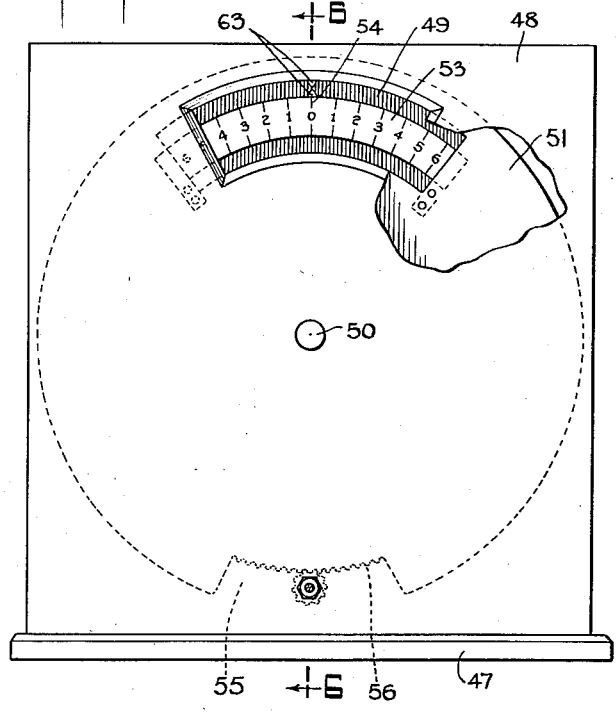
Fig. 5 is a front elevation of a visual indicating apparatus equipped with means for moving the indicating elements thereof into registry with the zero point on a dial.

The microphone pick-up 17 is connected to the input of either of the grid glow triode circuits shown in Figs. 2, 3 and 4 or is connected to the input of the amplifier circuit shown in Fig. 11. The triode circuits are preferably contained in a casing 23, Fig. 11, provided with a rotatable knob 21 for controlling the volume of the current delivered from the circuits. Also the apparatus shown in Fig. 1 is contained in the casing or box 20. In Fig. 11 there is shown a watch 22 in position on radially extending stepped members similar to the members 15 illustrated in Fig. 1.

The circuits shown in Figures 2, 3, and 4 illustrate the operation of a grid glow triode in converting received electrical or mechanical impulses—whether the same consist of single impulses or a series of single impulses, or whether the impulses consist of a wave train or a series of separate wave trains—into single electrical impulses of large magnitude and extremely short duration. The invention, therefore, is not limited to the calibration of watches, clocks, or other time piece mechanisms, but may be utilized for the comparison of any series of impulses, or combination of series of impulses, or of trains of impulses, whether in single or multiple wave.

In Figure 2, the triode 25 has its heater 26 supplied with heater current from a suitable source of electricity 27, and its plate supplied with high voltage current across the resistance 28. The cathode 29 can be adjusted along the resistance 28 to obtain any proportion of plate voltage to grid voltage. For example, if the grid voltage be raised to the point where no plate current will flow, any positive input sufficient to drive the grid below such point will allow the plate current to flow. However, since the supply of current is obtained mainly from the condenser 30—because the resistance 31 is made sufficiently high to pass very little current—the plate voltage drops below the ionization voltage of the gas triode 25 and the current flow stops. The stoppage of current is extremely sudden and it is this sudden stoppage of current which, by reason of the well known principle of self-induction, produces a voltage of large magnitude and short duration across the coil 32. Moreover, the combination of condenser 30 and resistance 31 acts as a filter to minimize the effect of these high peak voltages on the rest of the circuit, especially if a high gain amplifier is used to feed the grid of the triode and is connected to the common power supply.

A further advantage of having the proportion of plate to grid voltage variable is that the device may be controlled to exclude any impulses below a certain desired level.

The voltage across the coil 32 may be used to ignite a neon lamp or similar gas bulb, or may be fed into the primary of a spark coil and thus be made to actuate a relay or to control other similar devices.

A particular advantage of the above described circuit when used with a spark coil is that the combination of condenser 30, resistance 31 and coil 32 can be chosen so that the spark produced consists of a single spark only, any further impulses produced being damped out by condenser 30. Moreover, the polarity of the voltage produced in the inductance is opposite in direction to the polarity of the normal applied plate voltage and hence opposes any uncontrolled sparking. Since the spark produced is of such short duration, very high speed of rotation of the sparking elements can be stroboscopically observed or checked.

The condenser $C_1$ and the resistance $R_3$ are conventional in circuits of the type here concerned.

Figure 3 shows a circuit similar in major respects to that of Figure 2 and with a vibration or other pick-up 34 directly in the grid circuit of the gas triode. The operation of this circuit is identical with that of the circuit shown in Figure 2.

Figure 4 shows a circuit employing a carbon transmitter 35 which derives its exciting voltage from the current flow in the resistance 28. Since the resistance of 28 is comparatively small, any change in current produced due to agitation of the carbon granules is practically all applied in the grid circuit of the gas triode 25. Also, the adjustment on resistance 28 is of peculiar value in this connection in that the normal variation of the carbon granules which manifest themselves as hissing or frying noises when changed into sound, can be compensated for, and only additional sounds or impulses will actuate the triode.

Figure 6:
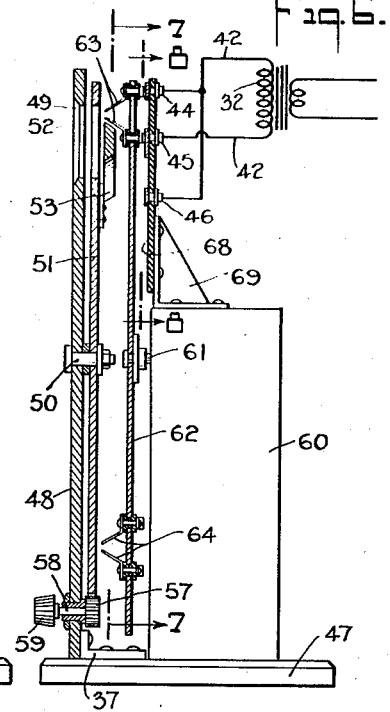
Fig. 6 is a sectional elevation on the line 6—6 of Fig. 5.

The triode circuits shown in Figures 2, 3 and 4 may be connected in the amplifying circuit shown in Figure 11. The mechanical sound made by the ticking or beat of the watch 22 is translated into electrical impulses in the amplifying circuit designated generally by the reference numeral 40 and the amplified electrical impulses are passed into the input side of the triode circuit designated generally by the reference numeral 41 in said Figure 11. The electrical impulses pass through the inductance coil 32 and a current is generated in the circuit 42 producing a high intensity spark of extremely short duration across the electrodes 43. The terminals of the output circuit 42 are connected, as shown in Figure 6, to electrodes 44, 45 and 46 as shown in Figure 6.

Referring to Figures 5 to 8 inclusive, 47 designates a base having a panel 48 erected thereon and secured in vertical position by means of the bracket 37. Adjacent to the top end of the panel 48 is formed an arcuate window 49. Centrally arranged on the panel 48 and extending rearwardly thereof is a stub shaft 50 on which is rotatably mounted a dial plate 51 provided with an arcuate preferably transparent window 52 which is visible through the window 49 in the panel 48.

Secured to the rear face of the rotatable member 51 is an arcuate scale 53 provided with graduations which extend on either side of a zero line 54. The lower portion of the rotatable dial plate 51 is cut away, as indicated by the reference numeral 55, and the cut away portion is provided with gear teeth 56. The teeth 56 mesh with the teeth of a pinion 57 secured to a shaft 58 journaled in the panel 48 and provided with a knurled handle 59 and by means of which the pinion 57 may be rotated. Rotation of the pinion 57 results in the rotation of the dial plate 51 to the right or left to bring the zero indication thereof to a point visible at any time through the window 49.

Mounted on the base 47 in the rear of the panel 48 is a casing 60 in which is housed (though not shown) a synchronous induction motor adapted to be driven by and in synchronism with a standard alternating current circuit, i. e., 110 volts, A. C. current. The driven shaft 61 of the above referred to synchronous motor extends outwardly of the casing 60 and preferably in substantial alignment with the stub shaft 50 above referred to.

Figure 7:
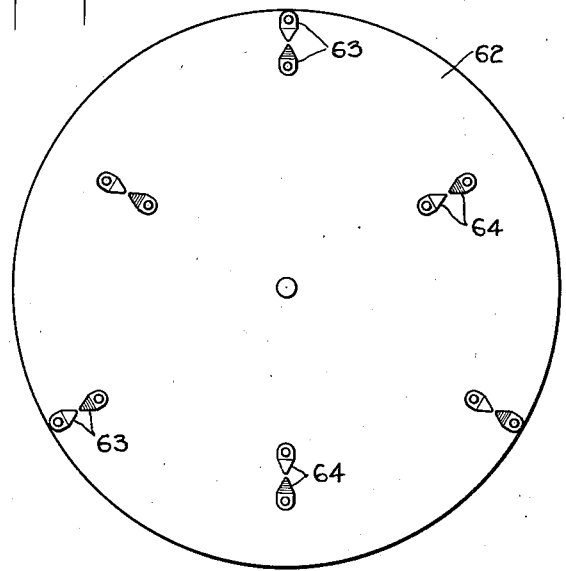
Fig. 7 is a sectional elevation on the line 7—7 of Fig. 6.
Figure 8:
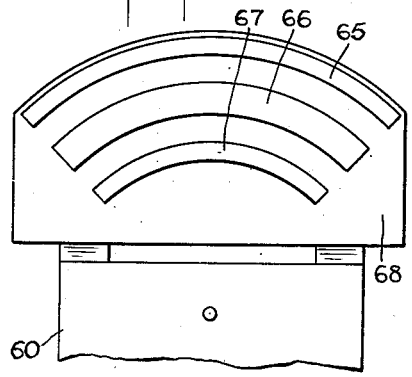
Fig. 8 is a section taken on the line 8—8 of Fig. 6.

Secured to the shaft 61 is a circular plate 62 of appropriate diameter and provided with sets of pairs of contacts as shown in Figure 7. There are three pairs of contacts in each set, each symmetrically arranged about the axis of rotation of the disc 62. There is the outer set comprised of pairs of contacts 63 and the inner set composed of the pairs of contacts 64. In Fig. 6 the uppermost one of the pair of contacts shown represents a pair of contacts 63 while the lowermost pair represent a pair of contacts 64. The contacts 63 and 64 are insulated from the disc 62. The terminals 44, 45 and 46 are connected respectively to conducting segments 65, 66 and 67 mounted on a plate 68. The plate 68 is secured to the top of the casing 60 by bracket 69. The conducting segments 65 and 67 are electrically connected together.

As the disc 62 carrying the plurality of pairs of contacts 63, 64 is rotated in synchronism with the motor current in the usual way the pairs of contacts 63, 64 are brought alternately and successively into engagement with a pair of the conducting segments 65, 66 and 67. That is, assuming the disc 62 to be rotated in a counterclockwise direction as viewed in Figure 7 the top pair of contacts 63 will be brought into engagement with the conducting segments 65 and 66 followed by the pair of contacts 64 which move into engagement with the conducting segments 66 and 67, this being followed by the next succeeding pair of contacts 64 which move the conducting segments 65 and 66. Thus it will be seen that a pair of contacts is brought successively into position with the terminals 44, 45 and/or 46 so that a current induced in the inductors 32 of the triode circuit or circuits shown in Figures 2, 3 and 4, will pass out through the output leads 42 and a spark will jump across the pair of contacts 63 or 64 as the case may be.

The spark produced at the contact 63 will be visible above the graduated dial 53 while the spark produced at the contact 64 will be visible below the graduated dial 53. The sparks produced at the contacts 63 and 64 are produced by surges of current in the output circuit of the triode circuit shown in Figs. 2, 3 and 4, and correspond to the beats of the watch shown in Fig. 12. The beats represent the to-and-from movement of the balance wheel so that, assuming the spark produced at the contacts 63 represent the swing of the balance wheel in one direction, then the spark produced at 64 will represent the swing of the balance wheel in the opposite direction.

The primary purpose of the invention is to obtain a visual indication of the mechanical condition of the component parts of the escapement mechanism of a timekeeping instrument such as a watch in order to enable the operator to intelligently adjust the component parts relative to each other for the purpose of obtaining perfect "beat" and insure that the timekeeping instrument will keep perfect time within the capacity of the mechanism for so doing.

The effect produced by the present invention will enable the operator or observer to determine from the position of the sparks relative to the graduations of the dial to each other whether or not the alternate swings of the balance mechanism occur in equal time intervals. The difference in the time interval between successive beats represents the operator or observer to determine the running qualities of the timekeeping instrument being tested. For example, if the difference in the time interval between successive beats is small, it may be safely assumed that the instrument is "in beat." On the contrary, if the difference in the time interval between successive beats is large the instrument is obviously "out of beat" and will require adjustment. Moreover if either beat exhibits any irregularity in itself the rate of the timekeeping instrument may still be determined if the other beat be steady. Thus any false interruption as to the rate of the instrument may be avoided by the operator adopting the reading or information obtained from the steadier beat. It also enables a skilled operator or observer to determine various other faults in the functioning of the instrument.

In the embodiment of the invention as shown there are 6 elements rotating about a center at such a speed that 300 of these elements pass the zero point on the graduated dial at equal time intervals in a space of one minute. In as much as the rate of a standard timepiece is 300 beats per minute it is then possible to refer the rate of the timepiece to the rate of passage of the element, and by the well known principles of stroboscopy, to determine any differences which may exist between the apparatus and the instrument under test. In order to determine how much the difference is in terms of seconds and minutes per day, the dial in the present embodiment of the invention is graduated into 24 equal parts arranged on either side of zero and occupying one-sixth part of a circle or 60°. Being so graduated, each division will indicate 12 seconds per day departure from the true time if the drift of the spark or the like produced thereby occurs in 30 seconds. If the observation is carried on for one minute significance of each division is halved and indicate 6 seconds per day and so on for any multiple or sub-multiple of 30 second intervals.

In place of the apparatus thus far described, and particularly in place of the apparatus shown in Figures 5 to 8 inclusive we may utilize the apparatus shown in Figures 9 and 10. In the structure shown in these two figures a base 70 has mounted thereon a casing 71 in which is arranged a synchronous motor 72 driving a shaft 73 at synchronous speed. On this shaft is attached a hub 74 carrying three indicating arms 75 symmetrically arranged about the shaft 73 as a center. Rotatably mounted in a wall of the casing 71 adjacent to the end of the shaft 73 carrying the pointers 75 is a disc or plate 76. This disc or plate 76 is provided at diammetrically opposite points with windows. Such windows are designated by the reference numerals 77 and 78.

The window 77 is arcuate in form and is closed by a translucent member 79 carrying a plurality of graduations 80 equally spaced on either side of a zero line. The window 78 may be provided with a similar plate or may be left open as shown. A portion of the periphery of the disc 76 is provided with gear teeth 81 which mesh with a pinion 82 secured to a shaft 83 rotatably mounted in the wall of the casing 71. By means of a knurled head 84 the shaft 83 may be readily rotated in either direction so as to move the zero indication on the member 79 in either direction.

Mounted on the top of the casing 71 is a container 83 which contains apparatus for flashing a spark or making a light to visually indicate the beats of a watch as in connection with the remaining figures heretofore described. Also located within the casing 71 is a box 84 carrying apparatus for making sparks in the same manner as is done by the apparatus in the box 83. No connections have been shown with regard to the boxes 83 and 84 and it will be understood from the showing in Fig. 6, taken in connection with Figures 2, 3, 4 and 11, that the sparks made by the apparatus contained in box 83 emanate from, for example, the swing of a balance wheel of a watch in one direction whereas the sparks emanating contained within the box 84 coincide with the beat of the balance wheel in the opposite direction.

Thus the beats of the watch may be separated and a comparison therebetween obtained as well as a comparison of the beats with respect to the synchronous motion of the arms 75 produced by the synchronous induction motor 72.

Assuming, therefore, that the shaft 73 is rotating in a counter-clockwise direction as indicated in Figure 9, it will be apparent that if the watch under test is reasonably accurate the uppermost arm 75 will have reached the zero point simultaneously with the making of the spark by the apparatus contained in 83 and thus the relation of the spark with respect to the uppermost arm 75 will be visually indicated on the graduated scale 80. As the shaft 73 rotates the next arm 75 to the left of Figure 9 will come into registration with the lowermost window 78, and will, if the watch is reasonably accurate be directly below the now uppermost arm 75 when the spark produced by the apparatus in the box 84 is made. The sparks produced electrically to indicate the mechanical noise made by the ticks of the watch are thus alternately made visible, top and bottom, of the device shown in Figure 9. From the relation between the arm 75 and the various sparks produced as above described, an operator will be able to determine whether the watch is running fast or slow and how much and will also be able to ascertain among other things the relation of the ticks of the watch, one to the other and thus to intelligently adjust the watch in a minimum of time.

We claim:

1. An improved apparatus for determining the accuracy of the rate of operation of a timekeeping instrument comprising, means for translating the mechanical sound vibrations produced by the balance wheel of the instrument into a series of groups of electrical impulses, means for amplifying said electrical impulses, a grid glow triode circuit connected to the output of the amplifier, for translating each group of impulses into a surge of current of high voltage and short duration, an indicating dial, a disc, a plurality of sets of spark points peripherally arranged with respect to the axis of rotation of the disc, to thereby bring one set of spark points above the indicating dial and the other set of spark points below the dial, a synchronous motor having an armature for rotating in synchronism with the electrical characteristics of a standard circuit, said disc being mounted on and rotated with the armature, brushes connected to the output of the triode circuit, said brushes being successively engaged by the pairs of spark points in the rotation of the disc to thereby discharge the surge of current built up in the triode circuit at a fixed time with relation to the graduations on the dial, to thereby visually indicate the relation between the beats of the timekeeping instrument and the standard rate of rotation of the spark points by the synchronous motor, and also thereby to indicate the relation between the alternate beats of the timekeeping instrument.

2. An improved holder for retaining mechanical timekeeping instruments in position to transmit as mechanical impulses the beats of the timekeeping instrument comprising a cylindrical body of resilient material having overlapping ends, radial projections at the ends acting as finger holds and by means of which the diameter of the cylindrical member may be increased, radially inwardly extending stepped members for accommodating timekeeping instruments of different diameters, the riser portion of the stepped members engaging with the periphery of the timekeeping instruments to yieldingly hold the timekeeping instrument in position, and a vibratory rod secured to and extending outwardly from the cylindrical member and having at its outer end a vibration responsive device.

3. Apparatus for the comparison of impulses, one with the next succeeding, in a series of successive impulses, comprising means for converting one series of alternate impulses of said successive impulses, into a substantially corresponding series of substantially instantaneous effects and for, likewise, converting the series of other alternate impulses of said successive impulses into a substantially corresponding series of substantially instantaneous effects; means arranged to indicate the effects of one of said series of successive, substantially instantaneous effects; means arranged relative to the last named means to indicate the effects of said other series of successive, substantially instantaneous effects; a support adapted for constant motion and having said indicating means mounted thereon, in mutual opposition, for constant motion therewith; means for imparting constant motion to said support; a scale disposed adjacent said movable support and normally held fixed; and means for causing the effects of one of said series of substantially instantaneous effects, alternately with the effects of the other of said series of substantially instantaneous effects, and vice versa, to manifest through their respective indicating means within a zone comprehended by said scale.

4. Apparatus for the comparison of impulses, one with the next succeeding, in a series of successive impulses, comprising an electrical circuit for converting one series of alternate impulses of said successive impulses into a substantially corresponding series of substantially instantaneous electrical impulses and for converting the series of other alternate impulses of said successive impulses into a substantially corresponding series of substantially instantaneous electrical impulses; visual flash means controlled by one of said series of successive, substantially instantaneous electrical impulses; a second visual flash means controlled by the other series of successive substantially instantaneous electrical impulses; a rotatable support upon which the respective flash means are mounted in mutual opposition for rotation therewith; means for rotating said support at a constant speed; a scale disposed adjacent said support and normally held fixed; and means for establishing connection between said electrical circuit and first one and then the other of said visual flash means, within a zone comprehended by said scale, for alternate indication on said scale.

LLOYD F. POLLARD.
FRANK A. HERRMANN.